US012742902B2

(12) United States Patent
Tsingas

(10) Patent No.: US 12,742,902 B2
(45) Date of Patent: Sep. 22, 2026

(54) SYSTEMS AND METHODS FOR MANAGING SEISMIC DATA

(71) Applicant: Saudi Arabian Oil Company, Dhahran (SA)

(72) Inventor: Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 142 days.

(21) Appl. No.: 18/772,873

(22) Filed: Jul. 15, 2024

(65) Prior Publication Data

US 2026/0016610 A1 Jan. 15, 2026

(51) Int. Cl.
*G01V 1/38* (2006.01)
*G01V 1/24* (2006.01)

(52) U.S. Cl.
CPC ............ *G01V 1/3808* (2013.01); *G01V 1/247* (2013.01); *G01V 1/3843* (2013.01)

(58) Field of Classification Search
CPC ..... G01V 1/3808; G01V 1/247; G01V 1/3843
See application file for complete search history.

(56) References Cited

U.S. PATENT DOCUMENTS 10,656,294 B2 5/2020 Tsingas et al.
10,788,597 B2 9/2020 Almomin et al.
10,935,680 B2 3/2021 Tsingas et al.
10,948,617 B2 3/2021 Tsingas et al.
11,249,214 B2 2/2022 Tsingas et al.
11,255,988 B2 * 2/2022 Moldoveanu .......... G01V 1/003
11,275,190 B2 3/2022 Tsingas et al.
11,280,924 B2 3/2022 Tsingas et al.
11,313,988 B2 4/2022 Tsingas et al.
11,320,557 B2 5/2022 Tsingas et al.
11,366,241 B2 6/2022 Alshuhail et al.
11,467,303 B2 10/2022 Tsingas et al.
11,500,116 B2 11/2022 Tsingas et al.
11,549,353 B2 1/2023 Tsingas et al.
2014/0078865 A1 * 3/2014 Coste .................... G01V 1/223 367/76

(Continued)

FOREIGN PATENT DOCUMENTS

NO 20190977 2/2021
RU 2750092 C2 * 6/2021 ............... G01V 3/16
WO WO 2023191641 10/2023

*Primary Examiner* — Daniel Pihulic
(74) *Attorney, Agent, or Firm* — Fish & Richardson P.C.

(57) ABSTRACT

Techniques for collecting seismic data include identifying seismic sources positioned on or under a first surface; identifying seismic sensors positioned on or under a second surface to form a seismic data collection area with the seismic sources; activating the seismic sources to generate a seismic signal; operating the seismic sensors to record a reflected seismic signal in response to the generated seismic signal; operating unmanned vehicles to travel to and within the seismic data collection area and collect the recorded reflected seismic signal from the seismic sensors; operating the unmanned vehicles to travel from the seismic data collection area to download the collected reflected seismic signal recorded from the seismic sensors; and operating the unmanned vehicles to return to or into the seismic data collection area to further collect at least one reflected seismic signal recorded from the seismic sensors.

20 Claims, 7 Drawing Sheets

(56) References Cited

U.S. PATENT DOCUMENTS

| | | | | |
|---|---|---|---|---|
| 2015/0316675 | A1* | 11/2015 | Brizard | G01V 1/3808 405/209 |
| 2019/0146111 | A1 | 5/2019 | Tsingas et al. | |
| 2019/0302286 | A1* | 10/2019 | Moldoveanu | G01V 3/16 |
| 2021/0263174 | A1 | 8/2021 | Gateman et al. | |
| 2026/0016610 | A1* | 1/2026 | Tsingas | G01V 1/3808 |

* cited by examiner

SYSTEMS AND METHODS FOR MANAGING SEISMIC DATA

TECHNICAL FIELD

This disclosure relates to systems and methods for recording seismic data, and more particularly, systems and methods for recording seismic data and confirming a quality of seismic data with one or more unmanned aerial vehicles (UAVs) and/or one or more autonomous underwater vehicles (AUVs).

BACKGROUND

During seismic onshore and offshore acquisition, there are a number of different sensing equipment (such as geophones, accelerometers and/or hydrophones) that are employed in the field to record seismic wavefields generated by seismic active sources. In onshore environments, seismic sensors are employed to record seismic wavefields on one vertical and/or three orthogonal components. These geophones or accelerometers are interconnected with cables and the recorded signals generated by seismic sources (such as seismic vibrator trucks and/or dynamite) are directly transmitted to the recording system in real time. Alternatively, in offshore environments, seismic wavefields generated by air gun arrays pulled behind a vessel are recorded by hydrophones and/or geophones/accelerometers situated inside multiple cables towed behind the vessel and transmitted instantly in the recording system located on board the vessel.

SUMMARY

In an example implementation, a seismic data collection system includes a plurality of seismic sources positioned on or under a first surface; a plurality of seismic sensors positioned on or under a second surface to form a seismic data collection area with the plurality of seismic sources; a plurality of unmanned vehicles; and a control system. Each of the plurality of seismic sources is configured to generate at least one seismic signal. Each of the plurality of seismic sensors is configured to record at least one reflected seismic signal in response to the generated at least one seismic signal. The plurality of unmanned vehicles are configured to travel within and adjacent to the seismic data collection area. Each of the unmanned vehicles is configured to collect the recorded at least one reflected seismic signal from the plurality of seismic sensors. The control system is configured to perform operations including instructing the plurality of unmanned vehicles to travel to and within the seismic data collection area; instructing at least one of the plurality of unmanned vehicles to travel from the seismic data collection area to download the collected at least one reflected seismic signal recorded from the plurality of seismic sensors; and instructing the at least one of the plurality of unmanned vehicles to return to or into the seismic data collection area to further collect at least one reflected seismic signal recorded from the plurality of seismic sensors.

In an aspect combinable with the example implementation, each of the plurality of seismic sensors is communicably decoupled from the control system.

In another aspect combinable with one, some, or all of the previous aspects, each of the plurality of seismic sources is configured to generate at least one seismic signal at one or more regular intervals to generate seismic wavefields.

In another aspect combinable with one, some, or all of the previous aspects, each of the plurality of seismic sensors is configured to blindly record the generated seismic wavefields and store the blindly recorded seismic wavefields.

In another aspect combinable with one, some, or all of the previous aspects, each of the unmanned vehicles is configured to collect the blindly recorded seismic wavefields.

In another aspect combinable with one, some, or all of the previous aspects, the operations include, during generation of the at least one seismic signal by the plurality of seismic sources and during recording of the at least one reflected seismic signal in response to the generated at least one seismic signal: analyzing the downloaded at least one reflected seismic signal recorded from the plurality of seismic sensors; and checking a quality of the downloaded at least one reflected seismic signal.

In another aspect combinable with one, some, or all of the previous aspects, the first surface includes a terranean surface, the second surface includes the terranean surface, and the plurality of unmanned vehicles include a plurality of unmanned aerial vehicles.

In another aspect combinable with one, some, or all of the previous aspects, the plurality of seismic sources include a plurality of explosives positioned on or under the terranean surface.

In another aspect combinable with one, some, or all of the previous aspects, the first surface includes an underwater floor, the second surface includes an offshore surface, and the plurality of unmanned vehicles include a plurality of autonomous underwater vehicles.

In another aspect combinable with one, some, or all of the previous aspects, the plurality of seismic sources include a towed array of seismic sources coupled to a support vessel configured to travel on or under the offshore surface.

In another example implementation, a method for collecting seismic data includes identifying a plurality of seismic sources positioned on or under a first surface; identifying a plurality of seismic sensors positioned on or under a second surface to form a seismic data collection area with the plurality of seismic sources; activating at least one of the plurality of seismic sources to generate at least one seismic signal; operating the plurality of seismic sensors to record at least one reflected seismic signal in response to the generated at least one seismic signal; operating a plurality of unmanned vehicles to travel to and within the seismic data collection area and collect the recorded at least one reflected seismic signal from the plurality of seismic sensors; operating at least one of the plurality of unmanned vehicles to travel from the seismic data collection area to download the collected at least one reflected seismic signal recorded from the plurality of seismic sensors; and operating the at least one of the plurality of unmanned vehicles to return to or into the seismic data collection area to further collect at least one reflected seismic signal recorded from the plurality of seismic sensors.

In an aspect combinable with the example implementation, each of the plurality of seismic sensors is communicably decoupled from the control system.

Another aspect combinable with one, some, or all of the previous aspects includes operating each of the plurality of seismic sources to generate at least one seismic signal at one or more regular intervals to generate seismic wavefields.

Another aspect combinable with one, some, or all of the previous aspects includes operating each of the plurality of seismic sensors to blindly record the generated seismic wavefields and store the blindly recorded seismic wavefields.

Another aspect combinable with one, some, or all of the previous aspects includes operating each of the unmanned vehicles to collect the blindly recorded seismic wavefields.

Another aspect combinable with one, some, or all of the previous aspects includes, during activating at least one of the plurality of seismic sources to generate at least one seismic signal and operating the plurality of seismic sensors to record at least one reflected seismic signal in response to the generated at least one seismic signal: analyzing the downloaded at least one reflected seismic signal recorded from the plurality of seismic sensors; and checking a quality of the downloaded at least one reflected seismic signal.

In another aspect combinable with one, some, or all of the previous aspects, the first surface includes a terranean surface, the second surface includes the terranean surface, and the plurality of unmanned vehicles include a plurality of unmanned aerial vehicles.

In another aspect combinable with one, some, or all of the previous aspects, the plurality of seismic sources include a plurality of explosives positioned on or under the terranean surface.

In another aspect combinable with one, some, or all of the previous aspects, the first surface includes an underwater floor, the second surface includes an offshore surface, and the plurality of unmanned vehicles include a plurality of autonomous underwater vehicles.

In another aspect combinable with one, some, or all of the previous aspects, the plurality of seismic sources include a towed array of seismic sources coupled to a support vessel configured to travel on or under the offshore surface.

Implementations of a seismic data collection system according to the present disclosure may include one or more of the following features. For example, implementations according to the present disclosure can solve "real time" data quality control and monitoring while the seismic data is blindly recorded by one or more seismic sensors (or nodes), which can last weeks and months. As another example, implementations according to the present disclosure can assess recorded seismic data quality in real time while a seismic crew is still in the field. Further, implementations according to the present disclosure can utilize unmanned drones to more quickly and efficiently perform seismic data quality control and monitoring while production data is continuously recorded by the seismic nodes. Also, implementations according to the present disclosure can avoid or reduce seismic reshooting and seismic field crew operational delays. As another example, implementations according to the present disclosure can facilitate data processing of quality control seismic data in order to redefine or even alter source frequency initial field configurations and specifications for seismic signal recording processes.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
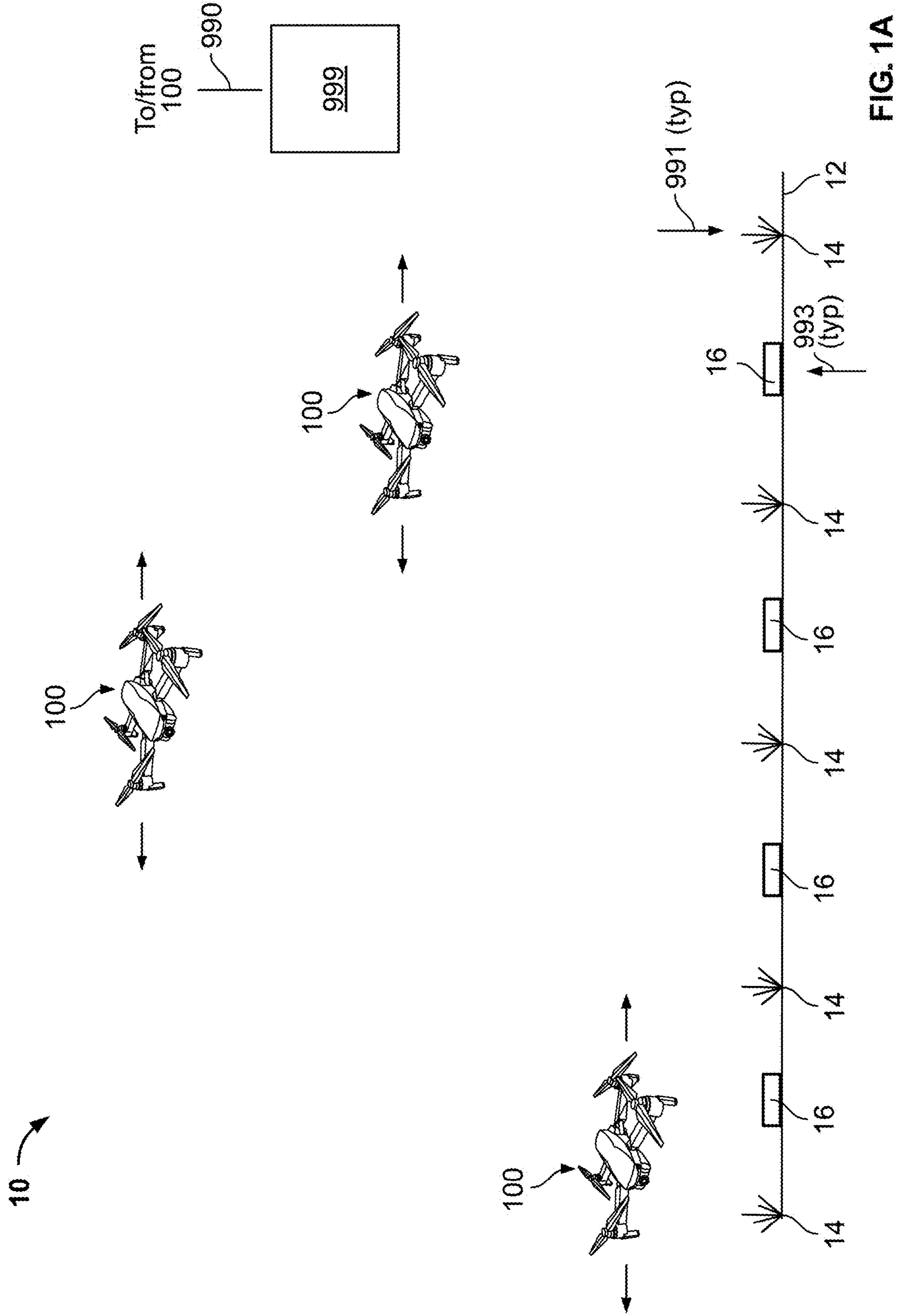
FIGS. 1A and 1B are schematic diagrams of an example implementation of a seismic data collection system according to the present disclosure.

The present disclosure describes example implementations of a seismic data collection system and methodology in which unmanned vehicles, such as unmanned aerial vehicles (UAVs) and/or autonomous underwater vehicles (AUVs) are deployed to collect seismic data, which can be used directly for seismic monitoring as well as for quality control of seismic data collection. Example implementations of seismic data collection systema according to the present disclosure can utilize one or more UAVs and/or one or more AUVs—also commonly called "drones"—for seismic data collection partly because of their maneuverability and ability to execute challenging tasks without a human present in or at the vehicle. In example aspects, a seismic data collection system can be used for onshore seismic surveys (for example, with UAVs). Further, a seismic data collection system can be used for offshore seismic surveys (for example, with AUVs). In operation of the example implementations of the seismic data collection systems, seismic data can be partially recorded and autonomously transferred back to a recording station where the data can be downloaded and analyzed for quality while the survey with the seismic data collection system is ongoing. Thus, even if a complete seismic data set is not fully recovered, quality analysis of the collected, partial data set can be completed (and can be used to change how the remaining data set is collected). In some aspects, with the assistance of UAVs and/or AUVs, assessment of the data quality can be made and monitored. Therefore, costly seismic reshooting can be avoided, and seismic nodal surveys can become more cost effective and efficient.

In both onshore and offshore environments, seismic data collection systems according to the present disclosure can continuously record and store the seismic signals during seismic acquisition with seismic sensors. Thus, seismic data collection systems according to the present disclosure can include nodal acquisition and the individual seismic sensors are called nodes. Since the nodes may not be connected with cables, the nodes tend to be more flexible and lighter in weight during the deployment and retrieval field activities. However, during nodal acquisition (onshore and/or offshore), the seismic observer may not have real time access to the recorded data. Thus, the nodal acquisition methodology implemented with seismic data collection systems of the present disclosure can be called "blind recording." Conventionally, the quality control of the seismic data recorded "blindly" can be delayed for days or weeks until the data are harvested from the nodes. This delay in confirming the quality of the seismic recorded data can result in costly reshooting or incomplete imaging of the geological targets if the signal was not properly recorded according to survey contractual specifications. However, with the seismic data collection systems of the present disclosure that use UAVs and/or AUVs, confirming the quality of the seismic recorded data can be implemented in real time, for example, while seismic data is still being recorded from one or more nodes in the nodal acquisition network.

Figure 1B:
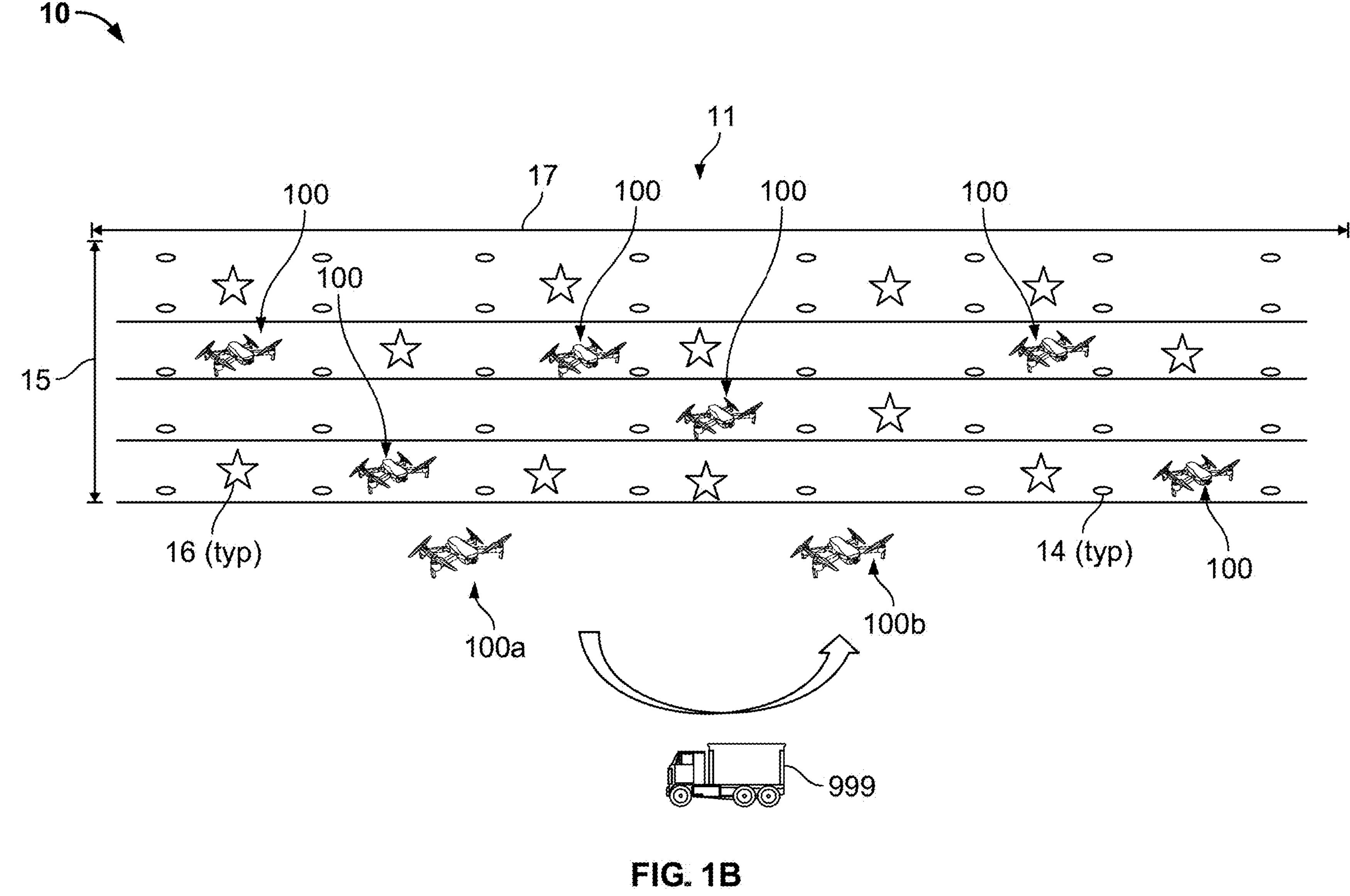

FIGS. 1A and 1B are schematic diagrams of an example implementation of a seismic data collection system 10 according to the present disclosure. Seismic data collection system 10, in this example implementation, can be implemented as an onshore nodal acquisition system on a terranean surface 12 with one or more UAVs 100 that travel in an airspace above the terranean surface 12. As shown in this example, the seismic data collection system 10 includes multiple seismic sources 14 (for example, tens, thousands, tens of thousands, or otherwise) that are positioned on or under (or a combination thereof) the terranean surface 12. Seismic sources 14 can include, for example, explosives, seismic source trucks (for example, thumper trucks) or other form of source that can generate or create a seismic signal 991. The seismic data collection system 10 also includes multiple seismic sensors (or nodes) 16 that are positioned on or under (or a combination thereof) the terranean surface 12. Nodes 16 can include, for example, geophones, DAS assemblies, fiber optic cables and sensors, or other form of seismic sensor that can receive a reflected seismic signal 993 in response to activation of one or more seismic sources to generate one or more seismic signals 991.

As shown in FIG. 1B specifically, the seismic sources 14 and seismic sensors 16 can be arranged in a grid that is defined by a first dimension 15 and a second dimension 17 to form a seismic data collection area 11. In some aspects, the first dimension 15 can be up to 6 km, while the second dimension 17 can be up to 10 km. The UAVs 100 (optionally equipped with seismic sensors as well) can move (for example, autonomously fly) over the seismic data collection area 11, for example, to a preplan specified location and record seismic data in addition to the nodes 16 and travel to control system 999 to download the data 990 that comprises the partial reflected seismic signals 993 (for example, for data quality control and assessment).

A control system 999 is positioned in or near the seismic data collection area 11 to receive data 990 from the UAVs 100 that return from the seismic data collection area 11. In some aspects, the control system 999 can be or represent, for example, a recording truck (or computing system on a recording truck) on the terranean surface 12. Thus, at any given moment during a seismic data recording process of the seismic data collection system 10, one or more UAVs 100 are operating over the seismic data collection area 11 to collect the seismic data (for example, the reflected seismic signals 993), one or more returning UAVs 100*a* are travelling to the control system 999 to download the collected seismic data, and one or more travelling UAVs 100*b* are returning to the seismic data collection area 11 after having downloaded the collected seismic data to control system 999.

As shown, nodes 16 are not connected to the control system 999 during nodal surveys (to collect the reflected seismic signals 993); thus, real time seismic signal-to-noise ratio quality control cannot be monitored due to this disconnection. Only when the nodes 16 are harvested for recorded seismic data, then the recorded data can be downloaded to control system 999 and can be checked in regards to data quality.

Figure 1C:
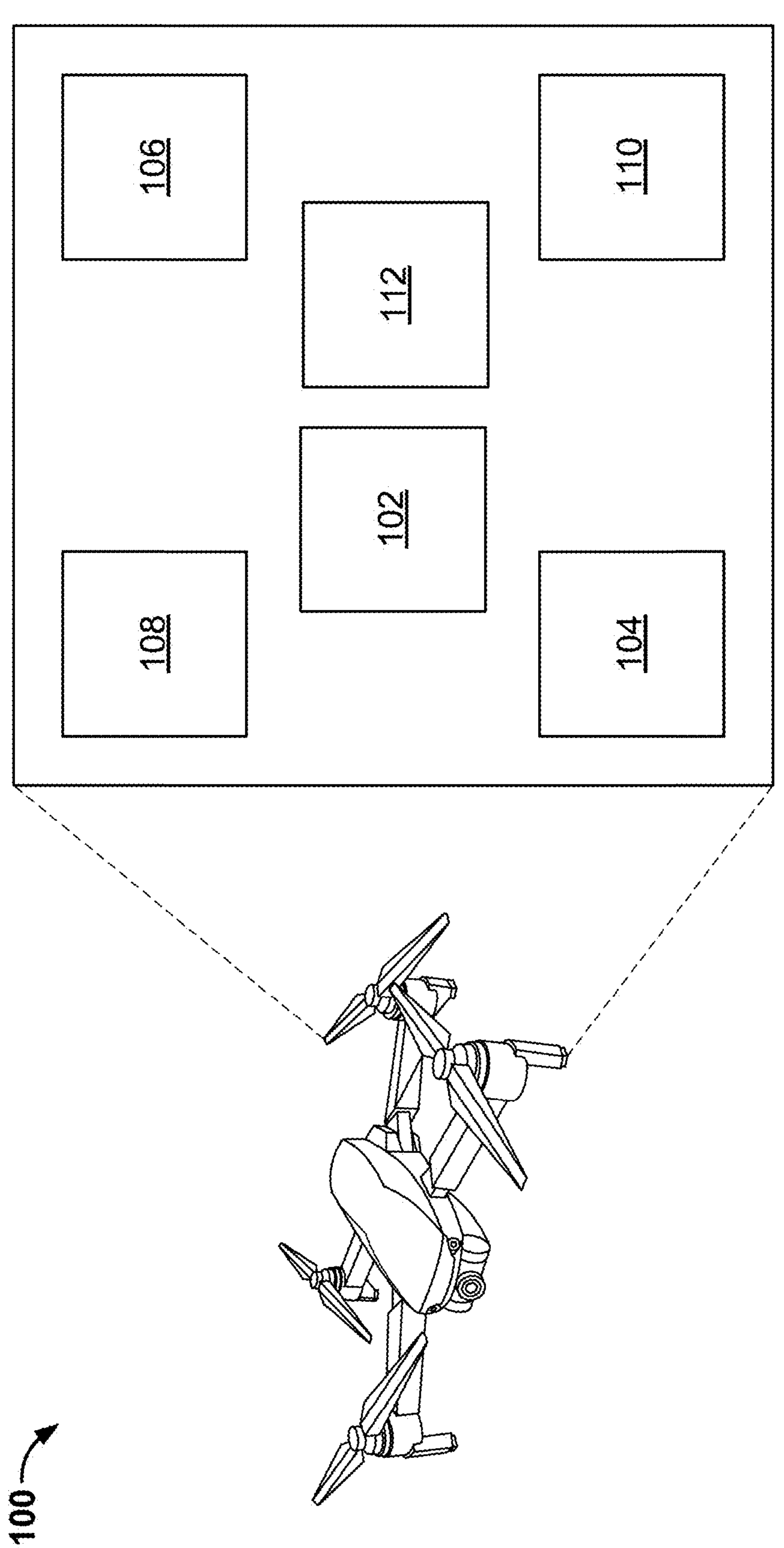
FIG. 1C is a schematic diagram of an example implementation of an unmanned aerial vehicle (UAV) that can be used in the seismic data collection system of FIGS. 1A and 1B according to the present disclosure.

Turning to FIG. 1C, a schematic diagram of the example implementation of the UAV 100 that can be used in the seismic data collection system 10 is shown. Generally, each UAV 100 comprises a drone (optionally with one or more seismic sensors 112) that is operable to fly as directed in the airspace, including fly at a particular altitude or altitude range in a constant flight pattern, move up or down between different altitudes or altitude ranges, or a combination thereof. This example implementation of the UAV 100 includes standard drone features (for example, multiple blade arrays that provide flight and altitude movement for the drone and a housing coupled to the blade arrays), as well as certain components operable within the seismic data collection system 10 according to the present disclosure.

For example, UAV 100 includes a power source 102 that provides power (for example, electrical power) to other components and, generally, the UAV 100 for flight operations. In some aspects, the power source 102 can be a rechargeable battery. The UAV 100 in this example also includes a controller 104, such as a microprocessor or ASIC based controller that can, for instance, store instructions in a memory and execute such instructions to control the UAV 100, whether based on preset instructions or commands (for example, from the control system 999). The UAV 100 in FIG. 1C also includes a communication module 106, which can, for example, receive data (from an external source such as the control system 999), transmit data (for example, measured or gathered by one or more on-board seismic sensors 112 as described herein), and provide the received data to the controller 104.

In this example, the UAV 100 also includes a global positioning sensor (GPS) module 108, which is operable to geolocate the UAV 100 in airspace and provide such data to the controller 104. Although called a GPS module 108, this module 108 can utilize any geolocation technique to determine a location (in three-dimensional space) of the UAV 100, whether stationary or moving in flight.

The UAV 100 also includes one or more optical sensors 110. For example, the optical sensor(s) 110 can include one or more high-definition (RGB) cameras that can acquire stationary or video images. The optical sensor(s) 110 can also include a light detection and ranging (LiDAR) sensor, which can measure distances by exploring the scene with the light. LiDAR systems have been adapted for UAVs, achieving lightweight systems useful for surveillance or mapping natural and artificial structures. As another example, the optical sensor(s) 110 can also include one or more thermal infrared (IR) cameras, which record longwave infrared (LWIR) radiations and turn them into calibrated temperature image/video footage. In addition, thermal sensors can be utilized along with a visual sensor to allow for a seamless overlay of temperature data with visible imagery for visual interpretations. The optical sensor(s) 110 can include one, some, or all of these examples.

In an example seismic data collection process implemented with or by the seismic data collection system 10, and prior to nodal acquisition by the UAVs 100, a presurvey plan can be developed in order to geolocate the seismic sources 14 and nodes 16 within the seismic data collection area 11. Two (or three) dimensional locations of the seismic sources 14 and nodes 16 can be defined according to subsurface geologic structures and their reservoir characterization objectives. A seismic survey can begin by deploying all the nodes 16 required for the surface coverage in the area 11 and a corresponding subsurface illumination. Next, the UAVs 100 are strategically deployed in the area 11 in predetermined or critical locations between the nodes 16 in the seismic data collection area 11. The seismic sources 14 begin (for example, at preset or predetermined periods or intervals) to generate seismic wavefields (in other words, patterns seismic signals 991). The seismic wavefields can be simultaneously "blindly" recorded by the nodes 16, as well as, in some aspects, live by the UAVs 100 in the area 11.

After a particular (for example, predetermined) time duration, one or more of the UAVs 100 can return to the control system 999 as UAVs 100*a* (for example, a time in which sufficient seismic data from the nodes 16 has been recorded). The collected seismic data from returning UAVs 100*a* can be downloaded to the control system 999 for real time data quality control processing. Upon completion of data downloading (and, in some aspects, after charging power sources 102), the travelling UAVs 100*b* return to, for example, another predefined surface locations within the area 11. Even while data from some of the UAVs 100 is being downloaded, the seismic sources 14 can be continuously operating and UAVs 100 within the area 11 (exclusive of UAVs 100*a* and 100*b*) continue recording the new source generated wavefields with the rest of the nodes 16.

If data quality of the collected and downloaded seismic data is acceptable, then the survey process can continue until the full seismic data collection area 11 is completed. If data quality of the collected and downloaded seismic data is not acceptable, the seismic sources 14 and/or seismic sensors 16 can be replaced, moved, or otherwise adjusted.

Figure 2A:
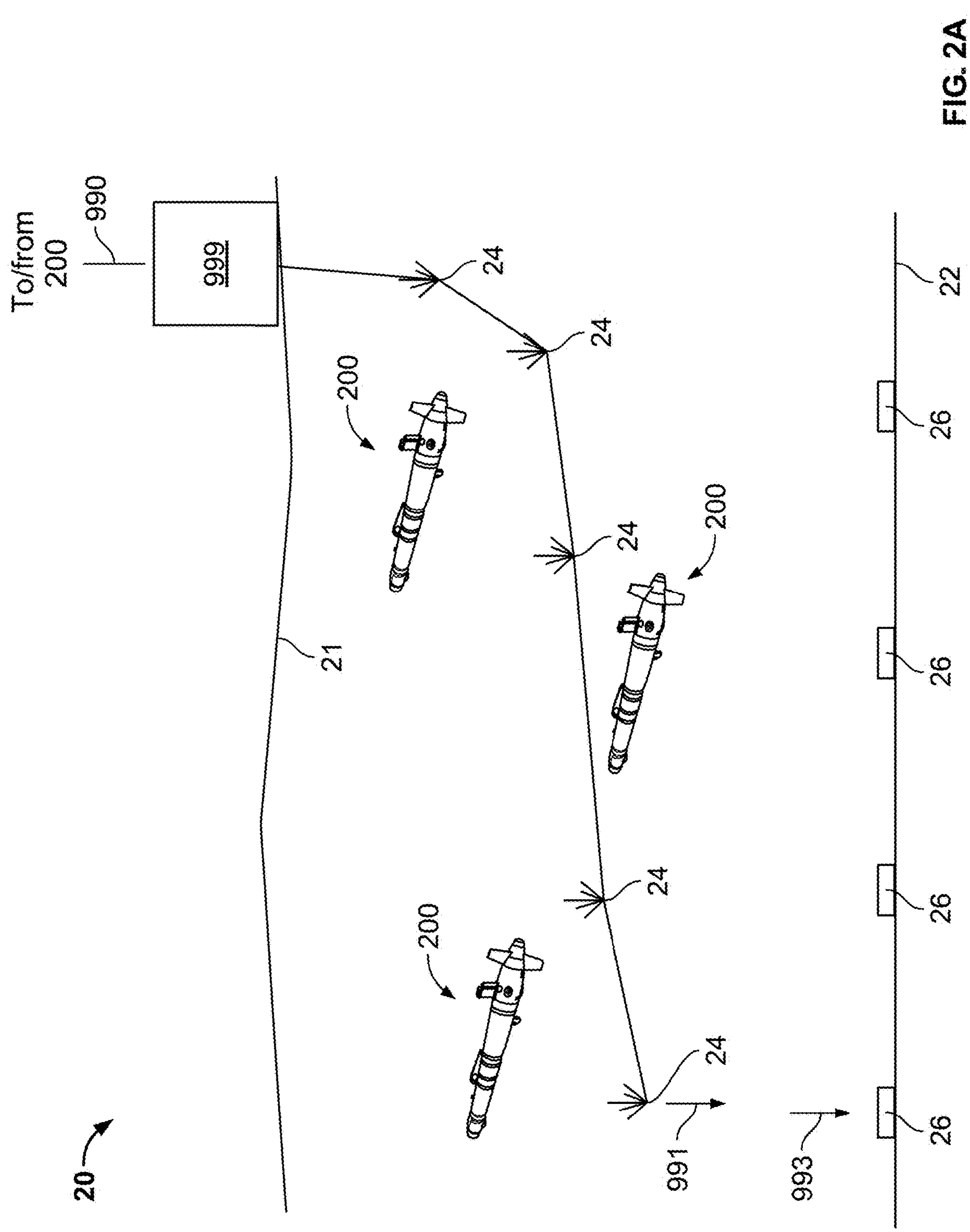
FIGS. 2A and 2B are schematic diagrams of another example implementation of a seismic data collection system according to the present disclosure.
Figure 2B:
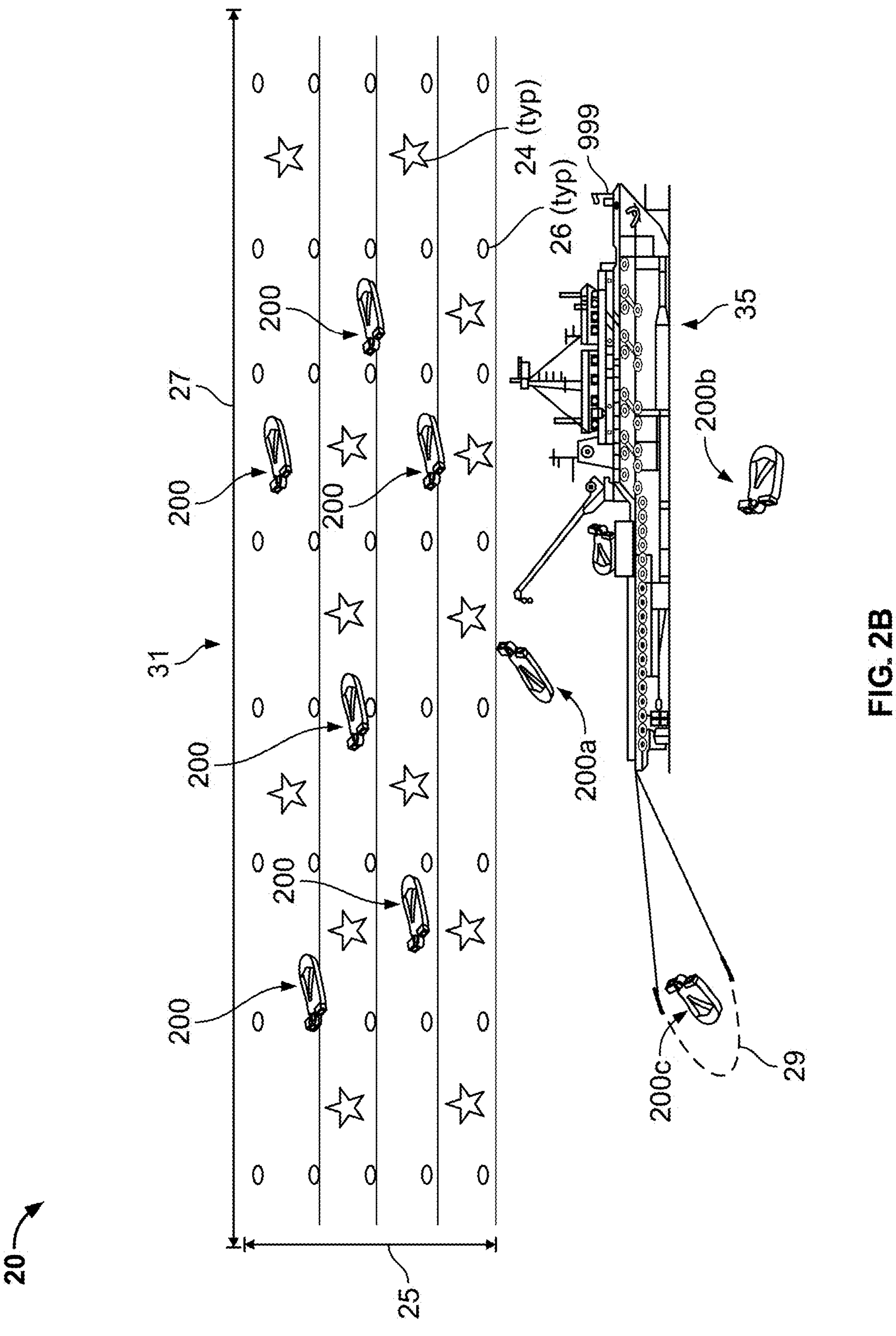

FIGS. 2A and 2B are schematic diagrams of another example implementation of a seismic data collection system 20 according to the present disclosure. Seismic data collection system 20, in this example implementation, can be implemented as an offshore (for example, lake, sea, ocean, gulf, or otherwise) nodal acquisition system on an offshore surface 21 over an underwater floor 22 with one or more AUVs 200 that travel on or under the offshore surface 21. As shown in this example, the seismic data collection system 20 includes multiple seismic sources 24 (for example, tens, thousands, tens of thousands, or otherwise) that are positioned on or under (or a combination thereof) the offshore surface 21. Seismic sources 24 can include, for example, a towed array of sources that includes the sources 24 on a cable towed by, for example, a boat or other water-based vehicle (such as support vessel 35 shown in FIG. 2B) that can generate or create a seismic signal 991. The seismic data collection system 20 also includes multiple seismic sensors (or nodes) 26 that are positioned on or under (or a combination thereof) the underwater floor 22. Nodes 26 can include, for example, geophones, hydrophones, DAS assemblies, fiber optic cables and sensors, or other form of seismic sensor that can receive a reflected seismic signal 993 in response to activation of one or more seismic sources to generate one or more seismic signals 991.

As shown in FIG. 2B specifically, the seismic sources 24 and seismic sensors 26 can be arranged in a grid that is defined by a first dimension 25 and a second dimension 27 to form a seismic data collection area 31. In some aspects, the first dimension 25 can be up to 6 km, while the second dimension 27 can be up to 10 km. The AUVs 200 can move (for example, autonomously propel through water) over the seismic data collection area 31 and, for example, land at random or specified preplanned locations at the underwater floor 22 to record similar data 990 as with the nodes 26 and collect data that comprises a sample of the reflected seismic signals 993.

In the example marine environment, a control system 999 (that is part of or on board the support vessel 35) is positioned in or near the seismic data collection area 31 to receive data 990 from the AUVs 200 that return from the seismic data collection area 31. In some aspects, the control system 999 can be or represent, for example, a support vessel (or boat) 35 (or computing system on a support vessel or boat) on the offshore surface 21. Thus, at any given moment during a seismic data recording process of the seismic data collection system 20, one or more AUVs 200 are operating underwater within the seismic data collection area 31 to collect the seismic data (for example, the reflected seismic signals 993), one or more returning AUVs 200*a* are travelling to the control system 999 (or other system on support vessel 35) to download the collected seismic data, and one or more travelling AUVs 200*b* are returning to the seismic data collection area 31 after having downloaded the collected seismic data to control system 999 (or other system on support vessel 35). As shown in this example, one or more collected AUVs 200*c* have been captured by a recovery net 29 to be brought onto support vessel 35 (after returning as AUVs 200*a*).

As shown, nodes 26 are not connected to the control system 999 (or other system on support vessel 35) during nodal surveys (to collect the reflected seismic signals 993); thus, real time seismic signal-to-noise ratio quality control cannot be monitored due to this disconnection. Only when the nodes 26 are harvested for recorded seismic data, then the recorded data can be downloaded to control system 999 (or other system on support vessel 35) and can be checked in regards to data quality.

Figure 2C:
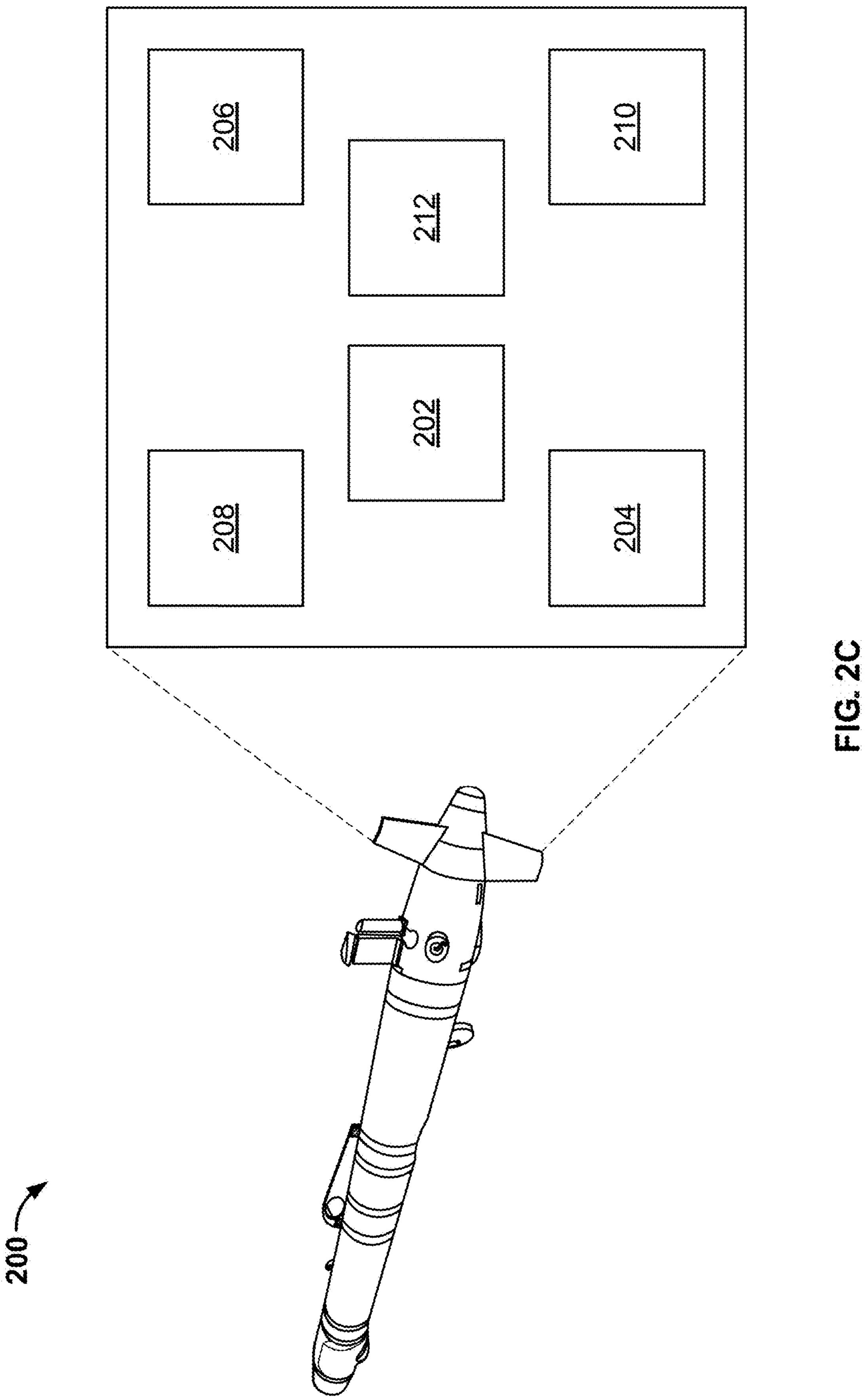
FIG. 2C is a schematic diagram of an example implementation of an autonomous underwater vehicle (AUV) that can be used in the seismic data collection system of FIGS. 1A and 1B according to the present disclosure.

Turning to FIG. 2C, a schematic diagram of the example implementation of the AUV 200 that can be used in the seismic data collection system 20 is shown. Generally, each AUV 200 comprises a drone (optionally with one or more seismic sensors 212) that is operable to self-propel as directed in the water, including propel at a particular depth or depth range in a constant pattern, move up or down between different depths or depth ranges, or a combination thereof. This example implementation of the AUV 200 includes standard underwater drone features (for example, propellors that provide movement and depth adjustment for the drone and a housing coupled to the propellors), as well as certain components operable within the seismic data collection system 20 according to the present disclosure.

For example, AUV 200 includes a power source 202 that provides power (for example, electrical power) to other components and, generally, the AUV 200 for underwater operations. In some aspects, the power source 202 can be a rechargeable battery. The AUV 200 in this example also includes a controller 204, such as a microprocessor or ASIC based controller that can, for instance, store instructions in a memory and execute such instructions to control the AUV 200, whether based on preset instructions or commands (for example, from the control system 999 or other system on support vessel 35). The AUV 200 in FIG. 2C also includes a communication module 206, which can, for example, receive data (from an external source such as the control system 999), transmit data (for example, measured or gathered by one or more on-board seismic sensors 212 as described herein), and provide the received data to the controller 204.

In this example, the AUV 200 also includes an underwater navigation module 208, which is operable to geolocate the AUV 200 in water and provide such data to the controller 204. Optionally, the AUV 200 also includes one or more optical sensors 210. For example, the optical sensor(s) 210 can include one or more high-definition (RGB) cameras that can acquire stationary or video images. The optical sensor(s) 210 can also include sonar sensors. As another example, the optical sensor(s) 210 can also include one or more thermal infrared (IR) cameras, which record longwave infrared (LWIR) radiations and turn them into calibrated temperature image/video footage. In addition, thermal sensors can be utilized along with a visual sensor to allow for a seamless overlay of temperature data with visible imagery for visual interpretations. The optical sensor(s) 210 can include one, some, or all of these examples.

In an example seismic data collection process implemented with or by the seismic data collection system 20, and prior to nodal acquisition by the AUVs 200, a presurvey plan can be developed in order to geolocate the seismic sources 24 and nodes 26 within the seismic data collection area 31. Two (or three) dimensional locations of the seismic sources 24 and nodes 26 can be defined according to subsurface geologic structures and their reservoir characterization objectives. A seismic survey can begin by deploying all the nodes 26 required for the surface coverage in the area 31 and a corresponding subsurface illumination. Next, the AUVs 200 are strategically deployed in the area 31 in predetermined or critical locations between the nodes 26 in the seismic data collection area 31. The seismic sources 24 begin (for example, at preset or predetermined periods or intervals) to generate seismic wavefields (in other words, patterns of seismic signals 991). The seismic wavefields can be simultaneously "blindly" recorded by the nodes 26, as well as, in some aspects, live by the AUVs 200 in the area 11.

After a particular (for example, predetermined) time duration, one or more of the AUVs 200 can return to the control system 999 as AUVs 200*a* (for example, a time in which sufficient seismic data from the nodes 26 has been recorded). The collected seismic data from returning AUVs 200*a* can be downloaded to the control system 999 for real time data quality control processing. Upon completion of data downloading (and, in some aspects, after charging power sources 202), the travelling AUVs 200*b* return to, for example, another predefined subsurface locations within the area 31. Even while data from some of the AUVs 200 is being downloaded, the seismic sources 24 can be continuously operating and AUVs 200 within the area 31 (exclusive of AUVs 200*a* and 200*b* and 200*c*) continue recording the new source generated wavefields with the rest of the nodes 26.

If data quality of the collected and downloaded seismic data is acceptable, then the survey process can continue until the full seismic data collection area 31 is completed. If data quality of the collected and downloaded seismic data is not acceptable, the seismic sources 24 and/or seismic sensors 26 can be replaced, moved, or otherwise adjusted.

Figure 3:
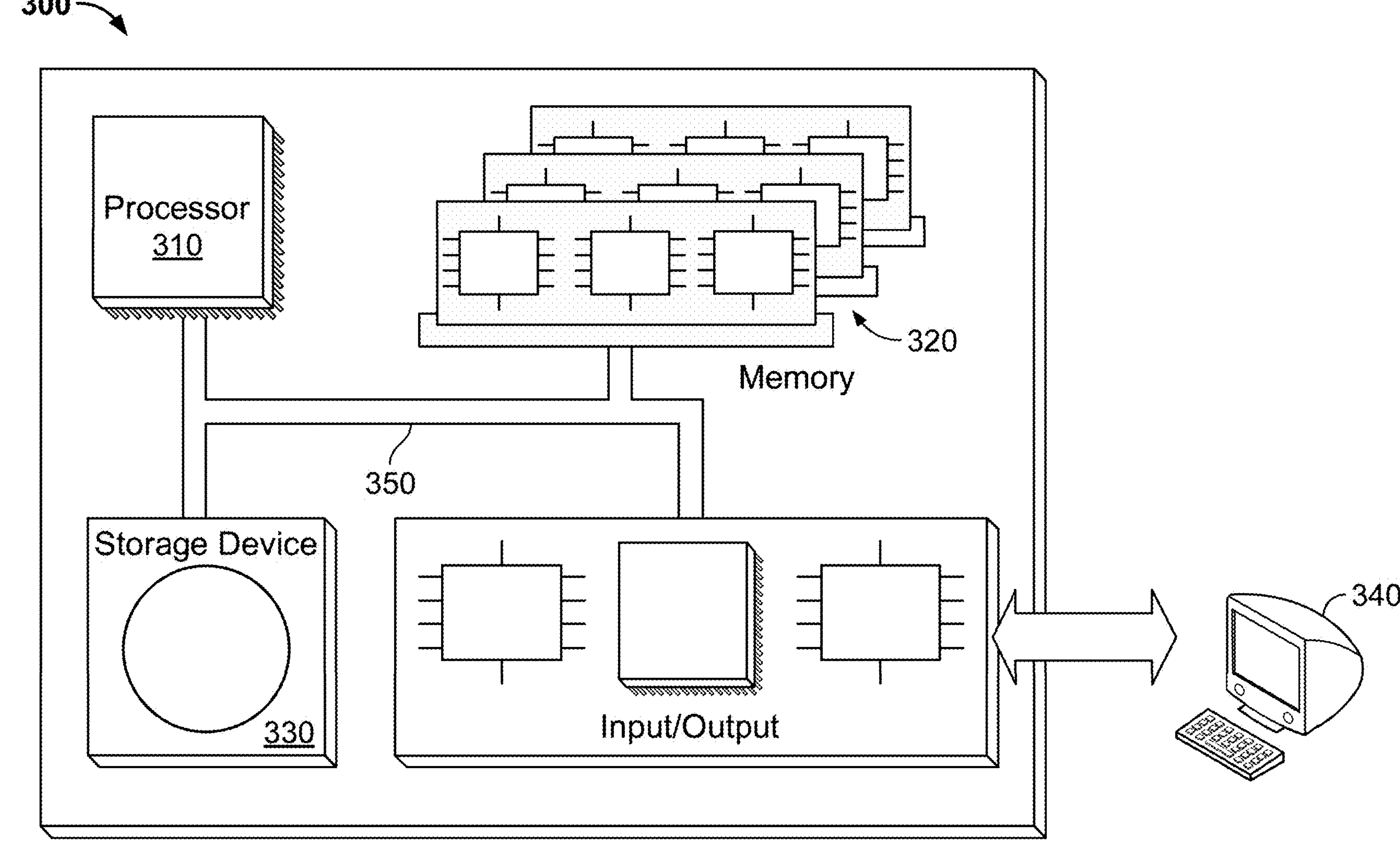
FIG. 3 is a schematic illustration of an example controller (or control system) for a seismic data collection system according to the present disclosure.

FIG. 3 is a schematic illustration of an example controller (or control system) 300 for a seismic data collection system according to the present disclosure. For example, the controller 300 may include or be part of a control system 999 shown as part of seismic data collection system 20 or 20 according to the present disclosure. The controller 300 is intended to include various forms of digital computers, such as printed circuit boards (PCB), processors, digital circuitry, or otherwise parts of a biocide testing system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340. Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the controller 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, or a tape device.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A seismic data collection system, comprising:

a plurality of seismic sources positioned on or under a first surface, each of the plurality of seismic sources configured to generate at least one seismic signal;

a plurality of seismic sensors positioned on or under a second surface to form a seismic data collection area with the plurality of seismic sources, each of the plurality of seismic sensors configured to record at least one reflected seismic signal in response to the generated at least one seismic signal;

a plurality of unmanned vehicles configured to travel within and adjacent to the seismic data collection area, each of the unmanned vehicles configured to collect the recorded at least one reflected seismic signal from the plurality of seismic sensors; and a control system configured to perform operations, comprising:

instructing the plurality of unmanned vehicles to travel to and within the seismic data collection area;

instructing at least one of the plurality of unmanned vehicles to travel from the seismic data collection area to download the collected at least one reflected seismic signal recorded from the plurality of seismic sensors while at least one of the plurality of seismic sources is generating the at least one seismic signal and at least another of the plurality of unmanned vehicles is traveling within the seismic data collection area to collect at least another recorded reflected seismic signal from at least one of the plurality of seismic sensors; and instructing the at least one of the plurality of unmanned vehicles to return to or into the seismic data collection area to further collect at least one reflected seismic signal recorded from the plurality of seismic sensors.

2. The seismic data collection system of claim 1, wherein each of the plurality of seismic sensors is communicably decoupled from the control system.

3. The seismic data collection system of claim 2, wherein each of the plurality of seismic sources is configured to generate at least one seismic signal at one or more regular intervals to generate seismic wavefields.

4. The seismic data collection system of claim 3, wherein each of the plurality of seismic sensors is configured to blindly record the generated seismic wavefields and store the blindly recorded seismic wavefields.

5. The seismic data collection system of claim 4, wherein each of the unmanned vehicles is configured to collect the blindly recorded seismic wavefields.

6. The seismic data collection system of claim 1, wherein the operations comprise, during generation of the at least one seismic signal by the plurality of seismic sources and during recording of the at least one reflected seismic signal in response to the generated at least one seismic signal:

analyzing the downloaded at least one reflected seismic signal recorded from the plurality of seismic sensors; and checking a quality of the downloaded at least one reflected seismic signal.

7. The seismic data collection system of claim 1, wherein the first surface comprises a terranean surface, the second surface comprises the terranean surface, and the plurality of unmanned vehicles comprise a plurality of unmanned aerial vehicles.

8. The seismic data collection system of claim 7, wherein the plurality of seismic sources comprise a plurality of explosives positioned on or under the terranean surface.

9. The seismic data collection system of claim 1, wherein the first surface comprises an underwater floor, the second surface comprises an offshore surface, and the plurality of unmanned vehicles comprise a plurality of autonomous underwater vehicles.

10. The seismic data collection system of claim 9, wherein the plurality of seismic sources comprise a towed array of seismic sources coupled to a support vessel configured to travel on or under the offshore surface.

11. A method for collecting seismic data, comprising:

identifying a plurality of seismic sources positioned on or under a first surface;

identifying a plurality of seismic sensors positioned on or under a second surface to form a seismic data collection area with the plurality of seismic sources;

activating at least one of the plurality of seismic sources to generate at least one seismic signal;

operating the plurality of seismic sensors to record at least one reflected seismic signal in response to the generated at least one seismic signal;

operating a plurality of unmanned vehicles to travel to and within the seismic data collection area and collect the recorded at least one reflected seismic signal from the plurality of seismic sensors;

operating at least one of the plurality of unmanned vehicles to travel from the seismic data collection area to download the collected at least one reflected seismic signal recorded from the plurality of seismic sensors;

while operating the at least one of the plurality of unmanned vehicles to travel from the seismic data collection area to download the collected at least one reflected seismic signal recorded from the plurality of seismic sensors:

operating at least one of the plurality of seismic sources to generate the at least one seismic signal, and operating at least another of the plurality of unmanned vehicles to travel within the seismic data collection area to collect the recorded at least another reflected seismic signal from at least one of the plurality of seismic sensors; and operating the at least one of the plurality of unmanned vehicles to return to or into the seismic data collection area to further collect at least one reflected seismic signal recorded from the plurality of seismic sensors.

12. The method of claim 11, wherein each of the plurality of seismic sensors is communicably decoupled from the control system.

13. The method of claim 12, comprising operating each of the plurality of seismic sources to generate at least one seismic signal at one or more regular intervals to generate seismic wavefields.

14. The method of claim 13, comprising operating each of the plurality of seismic sensors to blindly record the generated seismic wavefields and store the blindly recorded seismic wavefields.

15. The method of claim 14, comprising operating each of the unmanned vehicles to collect the blindly recorded seismic wavefields.

16. The method of claim 11, comprising, during activating at least one of the plurality of seismic sources to generate at least one seismic signal and operating the plurality of seismic sensors to record at least one reflected seismic signal in response to the generated at least one seismic signal:

analyzing the downloaded at least one reflected seismic signal recorded from the plurality of seismic sensors; and checking a quality of the downloaded at least one reflected seismic signal.

17. The method of claim 11, wherein the first surface comprises a terranean surface, the second surface comprises the terranean surface, and the plurality of unmanned vehicles comprise a plurality of unmanned aerial vehicles.

18. The method of claim 17, wherein the plurality of seismic sources comprise a plurality of explosives positioned on or under the terranean surface.

19. The method of claim 11, wherein the first surface comprises an underwater floor, the second surface comprises an offshore surface, and the plurality of unmanned vehicles comprise a plurality of autonomous underwater vehicles.

20. The method of claim 19, wherein the plurality of seismic sources comprise a towed array of seismic sources coupled to a support vessel configured to travel on or under the offshore surface.

* * * * *